US009845708B2

(12) United States Patent
Forcier

(10) Patent No.: US 9,845,708 B2
(45) Date of Patent: Dec. 19, 2017

(54) COWL WITH RATE LIMITED LOCK

(71) Applicant: United Technologies Corporation, Hartford, CT (US)

(72) Inventor: Matthew J. Forcier, Rocky Hill, CT (US)

(73) Assignee: United Technologies Corporation, Farmington, CT (US)

(*) Notice: Subject to any disclaimer, the term of this patent is extended or adjusted under 35 U.S.C. 154(b) by 284 days.

(21) Appl. No.: 14/647,838

(22) PCT Filed: Jan. 29, 2013

(86) PCT No.: PCT/US2013/023651
§ 371 (c)(1),
(2) Date: May 28, 2015

(87) PCT Pub. No.: WO2014/120127
PCT Pub. Date: Aug. 7, 2014

(65) Prior Publication Data
US 2015/0308292 A1 Oct. 29, 2015

(51) Int. Cl.
B64D 29/06 (2006.01)
F01D 25/28 (2006.01)
F01D 25/24 (2006.01)

(52) U.S. Cl.
CPC .............. F01D 25/28 (2013.01); B64D 29/06 (2013.01); F01D 25/24 (2013.01); F05D 2220/32 (2013.01)

(58) Field of Classification Search
CPC ......... F01D 25/28; F01D 25/24; B64D 29/06; B64D 29/28
See application file for complete search history.

(56) References Cited

U.S. PATENT DOCUMENTS

| 2,832,446 | A | | 4/1958 | Smith et al. |
| 3,194,595 | A | | 7/1965 | Wheeler et al. |
| 3,347,578 | A | | 10/1967 | Sheehan et al. |
| 4,044,973 | A | | 8/1977 | Moorehead |
| 4,150,802 | A | | 4/1979 | Evelyn et al. |
| 4,220,364 | A | | 9/1980 | Poe |
| 4,549,708 | A | * | 10/1985 | Norris .................... B64D 29/06 244/129.4 |
| 4,679,750 | A | | 7/1987 | Burhans |
| 4,825,644 | A | | 5/1989 | Bubello et al. |
| 4,858,970 | A | | 8/1989 | Tedesco et al. |
| 4,913,371 | A | | 4/1990 | Margetts |

(Continued)

FOREIGN PATENT DOCUMENTS

WO 2011151577 A2 12/2011

OTHER PUBLICATIONS

Extended European Search Report for EP Application No. 13873641.8, dated Jun. 30, 2016, 7 pages.

(Continued)

Primary Examiner — Woody Lee, Jr.
Assistant Examiner — Sabbir Hasan
(74) Attorney, Agent, or Firm — Kinney & Lange, P.A.

(57) ABSTRACT

A core cowl for use with an engine core of a gas turbine engine includes a first cowl section for covering a first side of an engine core and a second cowl section for covering a second side of the engine core. A locking retractor connects the first cowl section to a support structure.

18 Claims, 5 Drawing Sheets

(56) References Cited

U.S. PATENT DOCUMENTS

| | | |
|---|---|---|
| 4,920,744 A | 5/1990 | Garcia et al. |
| 5,068,946 A | 12/1991 | Marescot et al. |
| 5,076,514 A | 12/1991 | Melcher |
| 5,303,508 A | 4/1994 | Porte |
| 5,350,136 A | 9/1994 | Prosser et al. |
| 5,369,954 A | 12/1994 | Stuart |
| 5,915,765 A | 6/1999 | Sternberger |
| 6,032,901 A | 3/2000 | Carimali et al. |
| 6,189,832 B1 | 2/2001 | Jackson |
| 6,334,730 B1 | 1/2002 | Porte |
| 6,343,815 B1 | 2/2002 | Poe |
| 6,629,712 B2 | 10/2003 | Jackson et al. |
| 7,040,578 B2 | 5/2006 | Halin |
| 7,255,307 B2 | 8/2007 | Mayes |
| 7,703,716 B2 | 4/2010 | Bulin |
| 7,938,366 B2 | 5/2011 | Rueda et al. |
| 7,994,940 B2 | 8/2011 | Grichener et al. |
| 2011/0297787 A1 | 12/2011 | Guillaume et al. |
| 2012/0125010 A1 | 5/2012 | Michael et al. |

OTHER PUBLICATIONS

The International Search Report dated Mar. 26, 2013 for International Application No. PCT/US2013/023651.

* cited by examiner

COWL WITH RATE LIMITED LOCK

BACKGROUND

The present invention relates to gas turbine engines, and in particular, to cowl for use in gas turbine engines. Gas turbine engines typically include a compressor section, a combustor section, and a turbine section. During operation, such engines have high pressure gas in each of these sections. Some gas turbine engines include one or more other components that contain high pressure gas, such as flow passages for a bleed system. Some bleed systems, for example, have passages connected to the compressor section to transport compressed gas from the compressor to one or more systems or components that use compressed gas. For example, in some applications bleed air is used by turbine blades that are cooled and/or a cabin air conditioning and temperature control system on an aircraft.

Some gas turbine engines, such as propulsion gas turbine engines, include one or more cowls. For example, a core cowl can be used to cover an engine core (including the compressor section, the combustor section, and the turbine section). Typically, air pressure within the core cowl is relatively low. However, if a portion of the gas turbine engine containing high pressure gas within the core cowl has a leak, the pressure within the core cowl can rapidly increase and cause the core cowl to burst.

SUMMARY

According to the present invention, a gas turbine engine includes an engine core, a core cowl extending circumferentially around the engine core, and a locking retractor. The core cowl includes a first cowl section on a first side of the engine core and a second cowl section on a second side of the engine core. The locking retractor connects the first cowl section to a support structure.

Another embodiment is a core cowl for use with an engine core of a gas turbine engine. The core cowl includes a first cowl section for covering a first side of an engine core and a second cowl section for covering a second side of the engine core. A locking retractor connects the first cowl section to the second cowl section.

DETAILED DESCRIPTION

Figure 1:
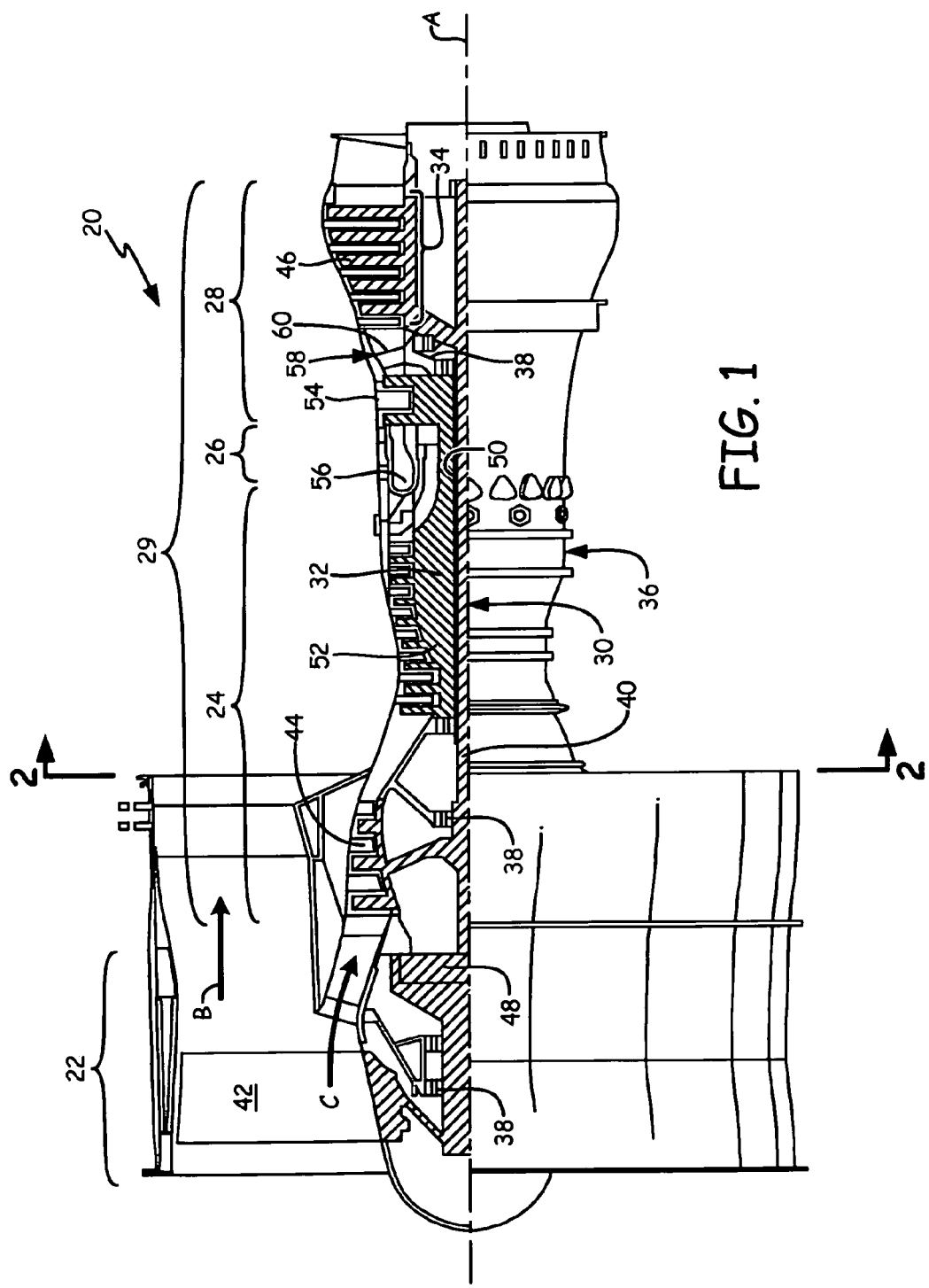
FIG. 1 is a schematic side sectional view of a gas turbine engine with a nacelle and core cowl removed.

FIG. 1 schematically illustrates an example gas turbine engine 20 that includes fan section 22, compressor section 24, combustor section 26 and turbine section 28. Alternative engines might include an augmenter section (not shown) among other systems or features. Fan section 22 drives air along bypass flow path B while compressor section 24 draws air in along core flow path C where air is compressed and communicated to combustor section 26. In combustor section 26, air is mixed with fuel and ignited to generate a high pressure exhaust gas stream that expands through turbine section 28 where energy is extracted and utilized to drive fan section 22 and compressor section 24. Compressor section 24, combustor section 26, and turbine section 28 combine to form engine core 29.

Although the disclosed non-limiting embodiment depicts one gas turbine engine, it should be understood that the concepts described herein are not limited to use with the illustrated gas turbine engine as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes low speed spool 30 and high speed spool 32 mounted for rotation about an engine central longitudinal axis A relative to an engine static structure 36 via several bearing systems 38. It should be understood that various bearing systems 38 at various locations may alternatively or additionally be provided.

Low speed spool 30 generally includes inner shaft 40 that connects fan 42 and low pressure (or first) compressor section 44 to low pressure (or first) turbine section 46. Inner shaft 40 drives fan 42 through a speed change device, such as geared architecture 48, to drive fan 42 at a lower speed than low speed spool 30. High-speed spool 32 includes outer shaft 50 that interconnects high pressure (or second) compressor section 52 and high pressure (or second) turbine section 54. Inner shaft 40 and outer shaft 50 are concentric and rotate via bearing systems 38 about engine central longitudinal axis A.

Combustor 56 is arranged between high pressure compressor 52 and high pressure turbine 54. In one example, high pressure turbine 54 includes at least two stages to provide a double stage high pressure turbine 54. In another example, high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of low pressure turbine 46 as related to the pressure measured at the outlet of low pressure turbine 46 prior to an exhaust nozzle.

Mid-turbine frame 58 of engine static structure 36 is arranged generally between high pressure turbine 54 and low pressure turbine 46. Mid-turbine frame 58 further supports bearing systems 38 in turbine section 28 as well as setting airflow entering low pressure turbine 46.

The core airflow C is compressed by low pressure compressor 44 then by high pressure compressor 52, mixed with fuel and ignited in combustor 56 to produce high speed exhaust gases that are then expanded through high pressure turbine 54 and low pressure turbine 46. Mid-turbine frame 58 includes vanes 60, which are in the core airflow path and function as an inlet guide vane for low pressure turbine 46. Utilizing vane 60 of mid-turbine frame 58 as the inlet guide vane for low pressure turbine 46 decreases the length of low pressure turbine 46 without increasing the axial length of mid-turbine frame 58. Reducing or eliminating the number of vanes in low pressure turbine 46 shortens the axial length of turbine section 28. Thus, the compactness of gas turbine engine 20 is increased and a higher power density may be achieved.

The disclosed gas turbine engine 20 in one example is a high-bypass geared aircraft engine. In a further example, gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, gas turbine engine 20 includes a bypass ratio greater than about ten (10:1) and the fan diameter is significantly larger than an outer diameter of low pressure compressor 44. It should be understood, however, that the above parameters are only exemplary of one embodiment of a gas turbine engine including a geared architecture and that the present disclosure is applicable to other gas turbine engines.

A significant amount of thrust is provided by bypass flow B due to the high bypass ratio. Fan section 22 of engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/518.7]^{0.5}$. The "Low corrected fan tip speed", as disclosed herein according to one non-limiting embodiment, is less than about 1150 ft/second.

The example gas turbine engine includes fan 42 that comprises in one non-limiting embodiment less than about twenty-six (26) fan blades. In another non-limiting embodiment, fan section 22 includes less than about twenty (20) fan blades. Moreover, in one disclosed embodiment low pressure turbine 46 includes no more than about six (6) turbine rotors schematically indicated at 34. In another non-limiting example embodiment low pressure turbine 46 includes about three (3) turbine rotors. A ratio between number of fan blades 42 and the number of low pressure turbine rotors is between about 3.3 and about 8.6. The example low pressure turbine 46 provides the driving power to rotate fan section 22 and therefore the relationship between the number of turbine rotors 34 in low pressure turbine 46 and number of blades 42 in fan section 22 disclose an example gas turbine engine 20 with increased power transfer efficiency.

Gas turbine engine 20 can include a nacelle (shown in FIG. 2), which has been opened and removed from FIG. 1 for clarity. Gas turbine engine 20 can include a number of other components, such as a bleed system having bleed air passages (not shown), which have also been omitted from FIG. 1 for clarity.

Figure 2:
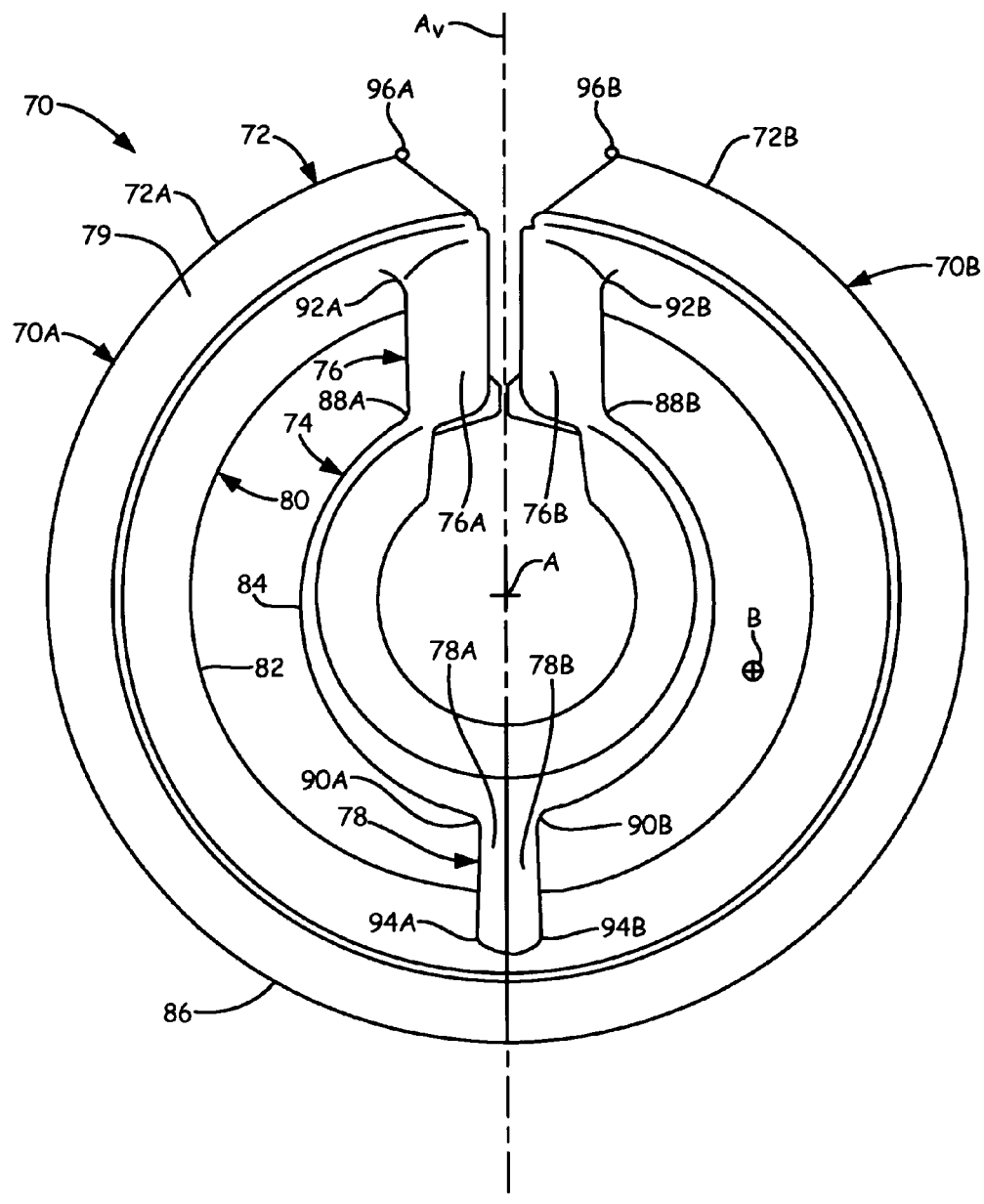
FIG. 2 is a schematic front sectional view of the nacelle of the gas turbine engine taken along line 2-2 of FIG. 1.

FIG. 2 is a schematic front sectional view of nacelle 70 of gas turbine engine 20 (shown in FIG. 1). Nacelle 70 includes outer cowl 72, core cowl 74, upper bifurcation structure 76, and lower bifurcation structure 78. Outer cowl 72 can include multiple sections, including a fan cowl section (not shown) and translating cowl section 79 positioned downstream of the fan cowl section. The fan cowl section, which is positioned radially outward of and covers fan section 22 and fan 42 (both shown in FIG. 1), is not shown in FIG. 2 because it is positioned axially forward of section line 2-2 of FIG. 1. Translating cowl section 79, which is positioned axially aft of section line 2-2 of FIG. 1, can include thrust reversers (not shown) for reversing thrust of gas turbine engine 20. In alternative embodiments, outer cowl 72 can have an alternative construction without a translating cowl section.

Core cowl 74 is positioned radially inward of outer cowl 72. Core cowl 74 is positioned radially outward of, extends circumferentially around, and covers compressor section 24, combustor section 26, and turbine section 28 (all shown in FIG. 1). Outer cowl 72 and core cowl 74 extend substantially circumferentially with respect to engine central longitudinal axis A. Outer cowl 72 is connected to core cowl 74 via upper bifurcation structure 76 and lower bifurcation structure 78. Upper bifurcation structure 76 and lower bifurcation structure 78 extend substantially radially with respect to engine central longitudinal axis A.

Nacelle 70 defines fan bypass duct 80 between outer cowl 72 and core cowl 74. Fan bypass duct 80 is a substantially annular duct that is bifurcated by upper bifurcation structure 76 and lower bifurcation structure 78. Outer wall 82 of fan bypass duct 80 is defined by outer cowl 72. Inner wall 84 of fan bypass duct 80 is defined by core cowl 74. Fan bypass duct 80 defines bypass flow path B between outer wall 82 and inner wall 84. Outer cowl 72 defines outer surface 86 of nacelle 70.

Nacelle 70 is split down engine vertical axis $A_v$ to divide first nacelle side 70A from second nacelle side 70B. Second nacelle side 70B is opposite of and substantially symmetrical to first nacelle side 70A. First nacelle side 70A includes outer cowl side 72A, core cowl side 74A, upper bifurcation side 76A, and lower bifurcation side 78A. Second nacelle side 70B includes outer cowl side 72B, core cowl side 74B, upper bifurcation side 76B, and lower bifurcation side 78B.

Core cowl side 74A is curved so as to be substantially arc-shaped, extending between upper bifurcation side 76A and lower bifurcation side 78A. Core cowl side 74A connects to upper bifurcation side 76A at core cowl corner 88A. Core cowl side 74A connects to lower bifurcation side 78A at core cowl corner 90A. Outer cowl side 72A connects to upper bifurcation side 76A at outer cowl corner 92A. Outer cowl side 72A connects to lower bifurcation side 78A at outer cowl corner 94A. Upper bifurcation side 76A and lower bifurcation side 78A extend substantially vertically from core cowl corners 88A and 90A, respectively.

Core cowl side 74B is curved so as to be substantially arc-shaped, extending between upper bifurcation side 76B and lower bifurcation side 78B. Core cowl side 74B connects to upper bifurcation side 76B at core cowl corner 88B. Core cowl side 74B connects to lower bifurcation side 78B at core cowl corner 90B. Outer cowl side 72B connects to upper bifurcation side 76B at outer cowl corner 92B. Outer cowl side 72B connects to lower bifurcation side 78B at outer cowl corner 94B. Upper bifurcation side 76B and lower bifurcation side 78B extend substantially vertically from core cowl corners 88B and 90B, respectively.

Nacelle 70 can be opened by pivoting first nacelle side 70A about upper hinge 96A in a first direction and pivoting second nacelle side 70B about upper hinge 96B in a second direction so as to expose gas turbine engine 20. When first and second nacelle sides 70A and 70B are pivoted outward, core cowl sides 74A and 74B pivot outward to expose engine core 29 (shown in FIG. 1). When closed, first and second core cowl sides 74A and 74B cover engine core 29.

During operation, the gas in engine core 29 can have relatively high pressure as compared to the gas between engine core 29 and core cowl 74 and as compared to the gas in fan bypass duct 80. If a portion of engine core 29 were to leak, the pressure within core cowl 74 could rapidly increase and tend to cause core cowl 74 to burst.

Figure 3:
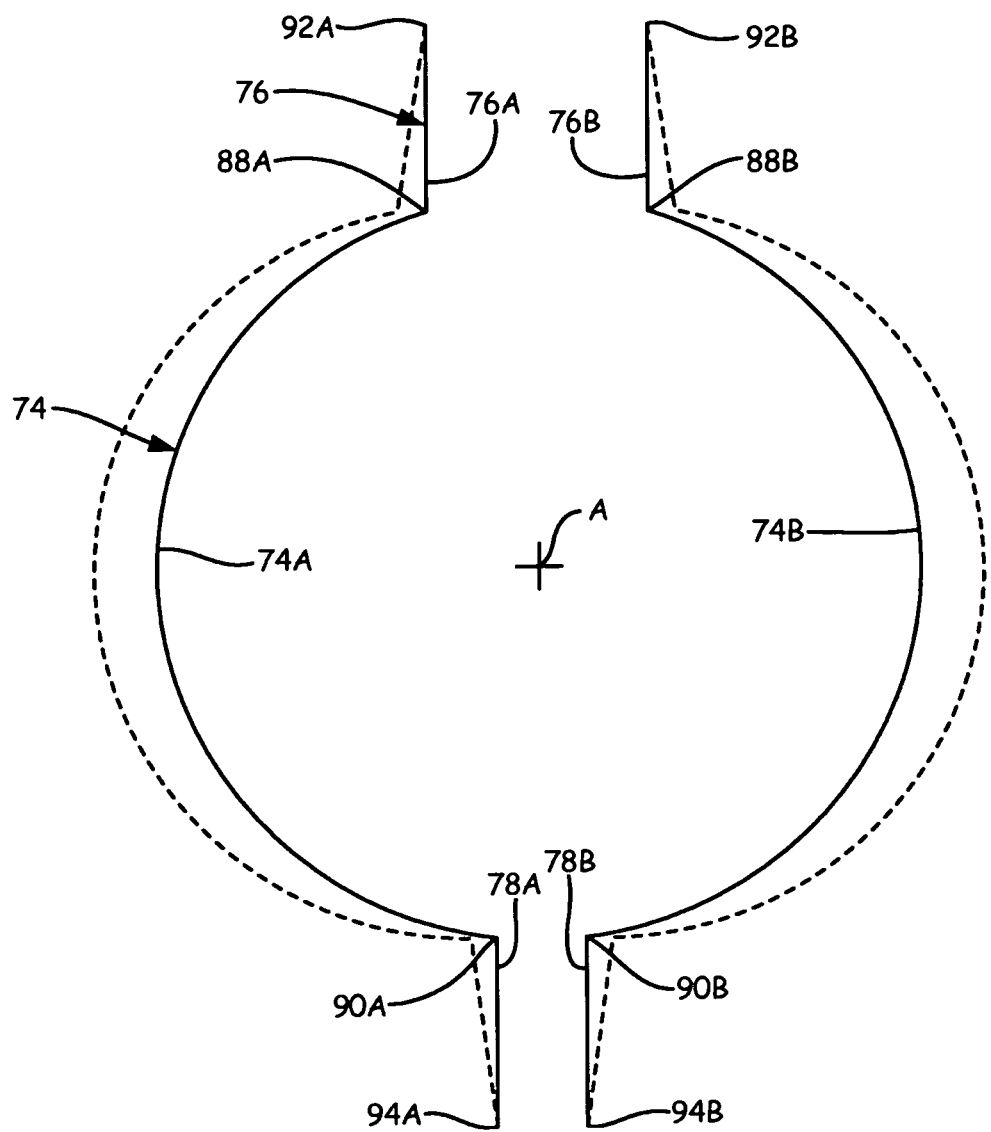
FIG. 3 is a simplified front sectional view of the core cowl of FIG. 2.

FIG. 3 is a simplified front sectional view of core cowl 74. When a high pressure gas leak increases pressure within core cowl 74, that pressure can tend to push core cowl 74 radially outwards. The solid line illustrates core cowl 74 under ordinary operating conditions and the dashed line illustrates a shape that core cowl 74 would tend to take under burst conditions, if not otherwise restrained by a latch (described below, with respect to FIGS. 4 and 5). Because outer cowl corners 92A, 92B, 94A, and 94B are structurally supported by outer cowl 72, outer cowl corners 92A, 92B, 94A, and 94B can remain relatively fixed under burst conditions. Core cowl sides 74A and 74B as well as core cowl corners 88A, 88B, 88C, and 88D can, however, be pushed to deflect radially outwards if not restrained by a latch.

Figure 4:
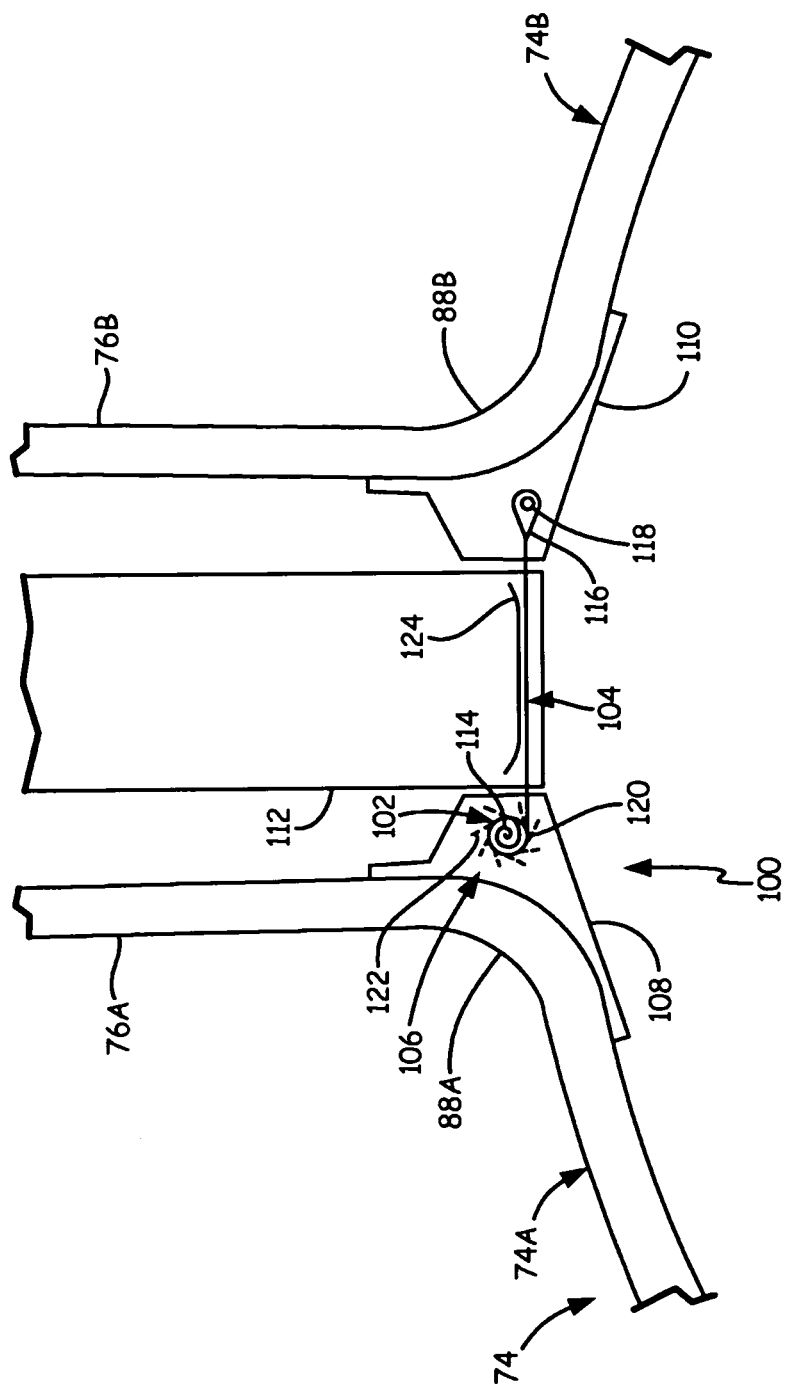
FIG. 4 is a schematic front sectional view of a first locking retractor.

FIG. 4 is a schematic front sectional view of locking retractor 100. Locking retractor 100 is a tensioning latch that functions to automatically lock in response to quick movement. Locking retractor 100 includes spool 102, flexible coupler 104, locking mechanism 106, and bumpers 108 and 110. Bumper 108 is connected to core cowl corner 88A of core cowl side 74A, and bumper 110 is connected to core cowl corner 88B of core cowl side 74B. Pylon 112, which is a support structure for mounting gas turbine engine 20 (shown in FIG. 1), is positioned between bumper 108 and bumper 110. Bumpers 108 and 110 can bump against pylon 112 when core cowl sides 74A and 74B are closed over engine core 29 (shown in FIG. 1). In an alternative embodiment, bumpers 108 and 110 can be positioned adjacent one another such that bumper 108 bumps bumper 110 when core cowl sides 74A and 74B are closed over engine core 29. In further alternative embodiments, bumpers 108 and 110 can be attached to portions of core cowl 74 other than core cowl corners 88A and 88B. For example, bumpers 108 and 110 could be attached near but not directly at core cowl corners 88A and 88B, respectively.

Spool 102 is rotatably attached to bumper 108. Spool 102 includes spring 114 that applies a force tending to rotate spool 102 in a first, retracting direction. Flexible coupler 104 is attached to spool 102 at a first end and is wrapped around spool 102. Flexible coupler 104 is attached to bumper 110 at a second end. In the illustrated embodiment, flexible coupler 104 includes loop 116 at a free end of flexible coupler 104. Loop 116 is removably attached to pin 118, which is rigidly attached to bumper 110. In an alternative embodiment, flexible coupler 104 can be attached to bumper 110 without loop 116 and pin 118, such as being fixedly attached to bumper 110. In the illustrated embodiment, flexible coupler 114 is a flexible belt. In alternative embodiments, flexible coupler 114 can be another type of coupler suitable for the application, such as a cable or a chain.

Locking mechanism 106 is an inertial locking mechanism connected to spool 102 for locking rotation of spool 102 in response to spool 102 rotating relatively quickly. In the illustrated embodiment, locking mechanism 106 includes spool teeth 120 and fixed teeth 122. Spool teeth 120 are pivotably connected to spool 102 such that spool teeth 120 pivot radially outward when spool 102 rotates relatively quickly. Spool teeth 120 can be biased to pivot inwards via one or more springs (not shown) or other mechanisms when spool 102 rotates relatively slowly or is stationary. Fixed teeth 122 are rigidly connected to bumper 108. Fixed teeth 122 are positioned adjacent but spaced from spool teeth 120, such that spool teeth 120 engage fixed teeth 122 when spool 102 rotates relatively quickly and are disengaged from fixed teeth 122 when spool 102 rotates relatively slowly.

When nacelle 70 is opened relatively slowly, such as by maintenance personnel, core cowl 74 can also open relatively slowly. Bumper 108 is thus pulled away from bumper 110, which pulls and lengthens flexible coupler 104 as it rotates spool 102. Because spool 102 is rotated relatively slowly, locking mechanism 106 remains disengaged, allowing spool 102 to continue rotating. Guide 124 is a guide for flexible coupler 104 and is attached to pylon 112. As core cowl 74 is opened, guide 124 can support and guide flexible coupler 104. As core cowl 74 is closed, spring 114 can cause spool 102 to rotate in the retracting direction to retract flexible coupler 104.

When pressure increases inside core cowl 74 under burst conditions, that pressure can push core cowl sides 74A and 74B outward relatively quickly, which pulls on flexible coupler 104 of locking retractor 100 and causes spool 102 to rotate relatively quickly. When spool 102 rotates relatively quickly, spool teeth 120 can engage fixed teeth 122 causing locking mechanism 106 to lock rotation of spool 102. When spool 102 is locked, locking retractor 100 can reduce or prevent deflection by core cowl 74. This can reduce or prevent damage to core cowl 74 and/or other components of gas turbine engine 20 (shown in FIG. 1) as compared to a core cowl without locking retractor 100. Though FIG. 4 illustrates only a single locking retractor, multiple locking retractors can be used at a top of core cowl 74. For example, one locking retractor 100 can connect core cowl corner 88A to pylon 112 and an additional locking retractor 100 can connect core cowl corner 88B to pylon 112.

In other alternative embodiments, locking retractor 100 can connect core cowl side 74A to a support structure other than core cowl side 74B or pylon 112. For example, one or more locking retractors 100 can extend from the arc-shaped portion of core cowl side 74A to a portion of engine static structure 36 (shown in FIG. 1). Similarly, one or more locking retractors 100 can also extend from the arc-shaped portion of core cowl side 74B to a portion of engine static structure 36.

Figure 5:
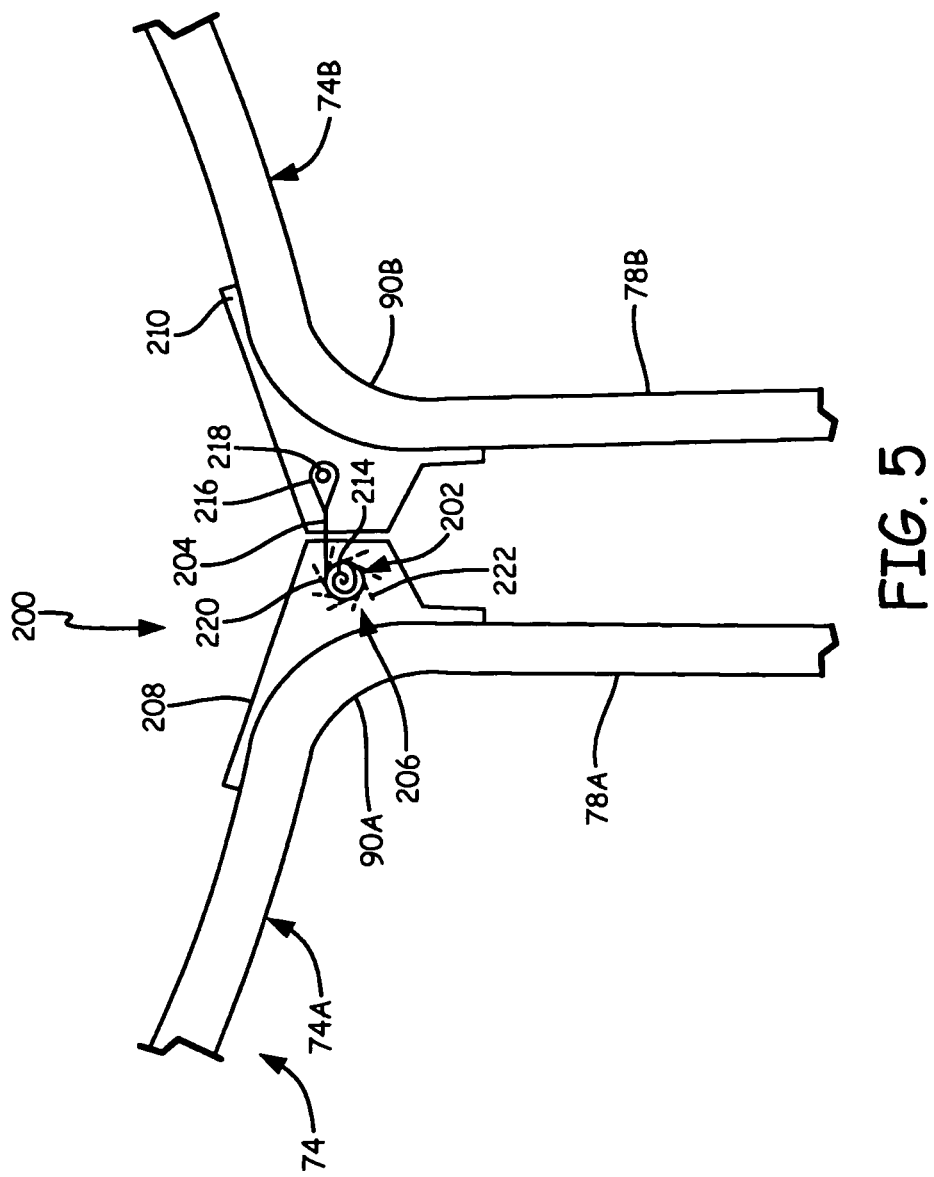
FIG. 5 is an schematic front sectional view of a second locking retractor.

FIG. 5 is a schematic front sectional view of locking retractor 200. Locking retractor 200 is similar to locking retractor 100, except that locking retractor 200 is configured for use at a bottom of core cowl 74. Locking retractor 200 is another tensioning latch that functions to automatically lock in response to quick movement. Locking retractor 200 includes spool 202, flexible coupler 204, locking mechanism 206, and bumpers 208 and 210. Bumper 208 is connected to core cowl corner 90A of core cowl side 74A, and bumper 210 is connected to core cowl corner 90B of core cowl side 74B. Bumpers 208 is adjacent bumper 210 so that bumpers 208 and 210 can bump against one another when core cowl sides 74A and 74B are closed over engine core 29 (shown in FIG. 1). In alternative embodiments, bumpers 208 and 210 can be attached to portions of core cowl 74 other than core cowl corners 90A and 90B. For example, bumpers 208 and 210 could be attached near but not directly at core cowl corners 90A and 90B, respectively.

Spool 202 is rotatably attached to bumper 208. Spool 202 includes spring 214 that applies a force tending to rotate spool 202 in a first, retracting direction. Flexible coupler 204 is attached to spool 202 at a first end and is wrapped around spool 202. Flexible coupler 204 is attached to bumper 210 at a second end. In the illustrated embodiment, flexible coupler 204 includes loop 216 at a free end of flexible coupler 204. Loop 216 is removably attached to pin 218, which is rigidly attached to bumper 210. In an alternative embodiment, flexible coupler 204 can be attached to bumper 210 without loop 216 and pin 218, such as being fixedly attached to bumper 210. In the illustrated embodiment, flexible coupler 214 is a flexible belt. In alternative embodiments, flexible coupler 214 can be another type of coupler suitable for the application, such as a cable or a chain.

Locking mechanism 206 is an inertial locking mechanism connected to spool 202 for locking rotation of spool 202 in response to spool 202 rotating relatively quickly. In the illustrated embodiment, locking mechanism 206 includes spool teeth 220 and fixed teeth 222. Spool teeth 220 are pivotably connected to spool 202 such that spool teeth 220 pivot radially outward when spool 202 rotates relatively quickly. Spool teeth 220 can be biased to pivot inwards via one or more springs (not shown) or other mechanisms when spool 202 rotates relatively slowly or is stationary. Fixed teeth 222 are rigidly connected to bumper 208. Fixed teeth 222 are positioned adjacent but spaced from spool teeth 220, such that spool teeth 220 engage fixed teeth 222 when spool 202 rotates relatively quickly and are disengaged from fixed teeth 222 when spool 202 rotates relatively slowly.

When nacelle 70 is opened relatively slowly, such as by maintenance personnel, core cowl 74 can also open relatively slowly. Bumper 208 is thus pulled away from bumper 210, which pulls and lengthens flexible coupler 204 as it rotates spool 202. Because spool 202 is rotated relatively slowly, locking mechanism 206 remains disengaged, allowing spool 202 to continue rotating. As core cowl 74 is closed, spring 214 can cause spool 202 to rotate in the retracting direction to retract flexible coupler 204.

When pressure increases inside core cowl 74 under burst conditions, that pressure can push core cowl sides 74A and 74B outward relatively quickly, which pulls on flexible coupler 204 of locking retractor 200 and causes spool 202 to rotate relatively quickly. When spool 202 rotates relatively quickly, spool teeth 220 can engage fixed teeth 222 causing locking mechanism 206 to lock rotation of spool 202. When spool 202 is locked, locking retractor 200 can reduce or prevent deflection by core cowl 74. This can reduce or prevent damage to core cowl 74 and/or other components of gas turbine engine 20 (shown in FIG. 1) as compared to a core cowl without locking retractor 200. Though FIG. 5 illustrates only a single locking retractor, multiple locking retractors can be used at a bottom of core cowl 74.

Thus, locking retractors 100 and 200 are locked when pressure within core cowl 74 pushes core cowl 74 relatively quickly outward. This allows locking retractors 100 and 200 to provide structural support to core cowl 74 under burst conditions. Because locking retractors 100 and 200 lock in response to burst conditions, maintenance personnel need not manually latch and unlatch locking retractors 100 and 200 when core cowl 74 is opened and closed for maintenance of engine core 29. This can save maintenance personnel time and effort. The fact that locking retractors 100 and 200 are automatically actuated provides a safety function that does not rely on maintenance personnel remembering to use locking retractors 100 and 200. By positioning locking retractors 100 and 200 at core cowl corners 88A, 88B, 90A, and 90B, locking retractors 100 and 200 can take advantage of the curved shape of core cowl sides 74A and 74B to provide hoop continuity and reduce or prevent deflection of all of core cowl 74. Including one or more locking retractors 100 and 200 on core cowl 74 can be particularly beneficial in applications with especially low pressure in fan bypass duct 80, such as engines having a fan driven by gearing, such as fan 42 and geared architecture 48.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims. For example, one or more locking retractors 100 and 200 need not be shaped and configured precisely as illustrated, but can be modified as suitable for a particular application. In some embodiments, locking retractors 100 and 200 can be attached directly to core cowl sides 74A and 74B, or can be attached to one or more structures that are attached to core cowl sides 74A and 74B other than bumpers 108, 110, 208, and 210.

Discussion of Possible Embodiments

The following are non-exclusive descriptions of possible embodiments of the present invention.

A gas turbine engine can include an engine core, a core cowl extending circumferentially around the engine core, and a locking retractor. The core cowl can include a first cowl section on a first side of the engine core and a second cowl section on a second side of the engine core. The locking retractor can connect the first cowl section to a support structure.

The gas turbine engine of the preceding paragraph can optionally include, additionally and/or alternatively any, one or more of the following features, configurations and/or additional components:

the support structure can be one of the second cowl section or a pylon;

the locking retractor can include a spool, a flexible coupler attached to and wrapped at least partially around the spool, and an inertial locking mechanism connected to the spool for locking rotation of the spool in response to the spool rotating relatively quickly;

the flexible coupler can be a belt, a chain, or a cable;

the spool can be mounted to the first cowl section and a free end of the flexible coupler can be attached to the second cowl section;

the spool can be mounted to a first bumper on a first corner of the first cowl section and a free end of the flexible coupler can be attached to a second bumper on a second corner of the second cowl section;

a pylon can be positioned between the first and second bumpers and a coupler guide can be attached to the pylon and positioned proximate the flexible coupler between the first bumper and the second bumper;

the inertial locking mechanism can include a plurality of teeth attached to the spool that pivot radially outward when the spool rotates relatively quickly;

the locking retractor can be attached to a first corner of the first cowl section;

the first cowl section can include a curved portion and a substantially vertical portion connected to the curved portion at the first corner;

the first cowl section can include a curved portion, a first substantially vertical portion connected to a top of the curved portion at the first corner, and a second substantially vertical portion connected to a bottom of the curved portion at a third corner, and/or a second locking retractor can connect the third corner of the first cowl section to a fourth corner of the second cowl section.

A core cowl for use with an engine core of a gas turbine engine can include a first cowl section for covering a first side of an engine core and a second cowl section for covering a second side of the engine core. A locking retractor can connect the first cowl section to the second cowl section.

The core cowl of the preceding paragraph can optionally include, additionally and/or alternatively any, one or more of the following features, configurations and/or additional components:

the locking retractor can include a spool, a flexible coupler attached to and wrapped at least partially around the spool, and an inertial locking mechanism connected to the spool for locking rotation of the spool in response to the spool rotating relatively quickly.

the flexible coupler can be a belt, a chain, or a cable;

the spool can be mounted to a first corner of the first cowl section and a free end of the flexible coupler can be attached to a second corner of the second cowl section;

the spool can be mounted to a first bumper on the first cowl section and a free end of the flexible coupler can be attached to a second bumper on the second cowl section;

the inertial locking mechanism can include a plurality of teeth attached to the spool that pivot radially outward when the spool rotates relatively quickly;

the locking retractor can extend from a first corner of the first cowl section to a second corner of the second cowl section; and/or the first cowl section can include a curved portion, a first substantially vertical portion connected to a top of the curved portion at the first corner, and a second substantially vertical portion connected to a bottom of the curved portion at a third corner.

The invention claimed is:

1. A gas turbine engine comprising:
an engine core;
a core cowl extending circumferentially around the engine core, the core cowl comprising:
a first cowl section on a first side of the engine core; and
a second cowl section on a second side of the engine core; and
a locking retractor connecting the first cowl section to a support structure, the locking retractor comprising:
a spool;
a flexible coupler attached to and wrapped at least partially around the spool; and
an inertial locking mechanism connected to the spool for locking rotation of the spool in response to the spool rotating relatively quickly.

2. The gas turbine engine of claim 1, wherein the support structure is one of the second cowl section or a pylon.

3. The gas turbine engine of claim 1, wherein the flexible coupler is a belt, a chain, or a cable.

4. The gas turbine engine of claim 1, wherein the spool is mounted to the first cowl section and a free end of the flexible coupler is attached to the second cowl section.

5. The gas turbine engine of claim 1, wherein the spool is mounted to a first bumper on a first corner of the first cowl section and a free end of the flexible coupler is attached to a second bumper on a second corner of the second cowl section.

6. The gas turbine engine of claim 5, and further comprising:
a pylon positioned between the first and second bumpers; and
a coupler guide attached to the pylon and positioned proximate the flexible coupler between the first bumper and the second bumper.

7. The gas turbine engine of claim 1, wherein the inertial locking mechanism comprises a plurality of teeth attached to the spool that pivot radially outward when the spool rotates relatively quickly.

8. The gas turbine engine of claim 1, wherein the locking retractor is attached to a first corner of the first cowl section.

9. The gas turbine engine of claim 8, wherein the first cowl section comprises:
a curved portion; and
a vertical portion connected to the curved portion at the first corner.

10. The gas turbine engine of claim 8, wherein the first cowl section comprises:
a curved portion;
a first vertical portion connected to a top of the curved portion at the first corner; and
a second vertical portion connected to a bottom of the curved portion at a third corner.

11. The gas turbine engine of claim 10, wherein the locking retractor is a first locking retractor, the gas turbine engine further comprising:
a second locking retractor connecting the third corner of the first cowl section to a fourth corner of the second cowl section.

12. A core cowl for use with an engine core of a gas turbine engine, the core cowl comprising:
a first cowl section for covering a first side of an engine core;
a second cowl section for covering a second side of the engine core; and
a locking retractor connecting the first cowl section to the second cowl section,
the locking retractor comprising:
a spool;
a flexible coupler attached to and wrapped at least partially around the spool; and
an inertial locking mechanism connected to the spool for locking rotation of the spool in response to the spool rotating relatively quickly.

13. The core cowl of claim 12, wherein the flexible coupler is a belt, a chain, or a cable.

14. The core cowl of claim 12, wherein the spool is mounted to a first corner of the first cowl section and a free end of the flexible coupler is attached to a second corner of the second cowl section.

15. The core cowl of claim 12, wherein the spool is mounted to a first bumper on the first cowl section and a free end of the flexible coupler is attached to a second bumper on the second cowl section.

16. The core cowl of claim 12, wherein the inertial locking mechanism comprises a plurality of teeth attached to the spool that pivot radially outward when the spool rotates relatively quickly.

17. The core cowl of claim 12, wherein the locking retractor extends from a first corner of the first cowl section to a second corner of the second cowl section.

18. The core cowl of claim 17, wherein the first cowl section comprises:
a curved portion;

a first vertical portion connected to a top of the curved portion at the first corner; and a second vertical portion connected to a bottom of the curved portion at a third corner.

* * * * *